C. P. BYRNES & J. B. HELLER.
CREDIT REGISTER.
APPLICATION FILED MAY 18, 1912.
1,145,552.
Patented July 6, 1915.
4 SHEETS—SHEET 3.
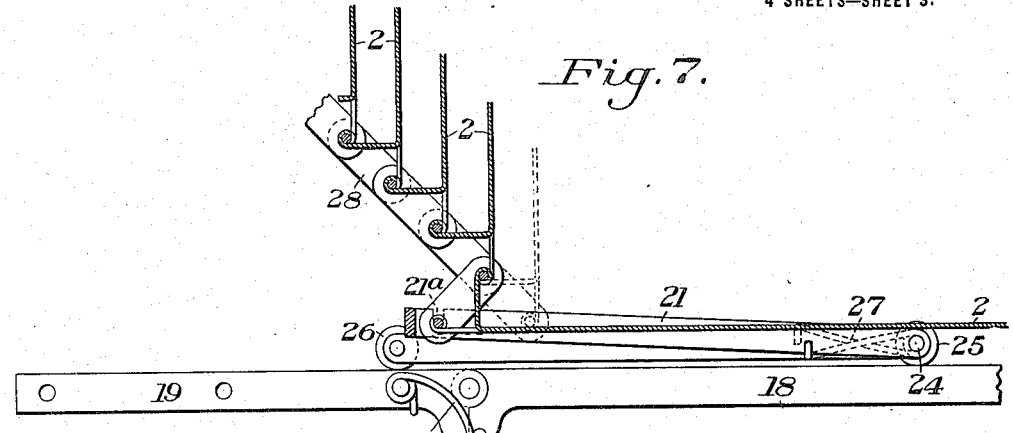
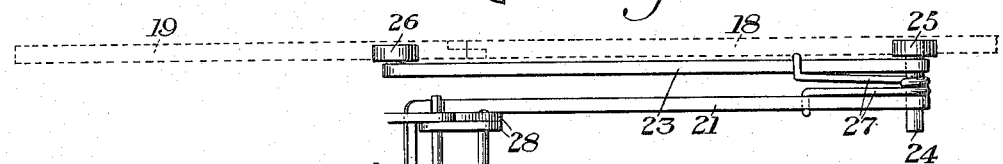
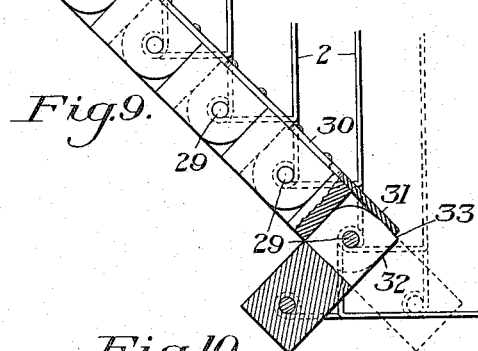
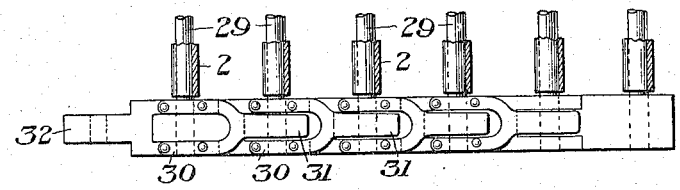

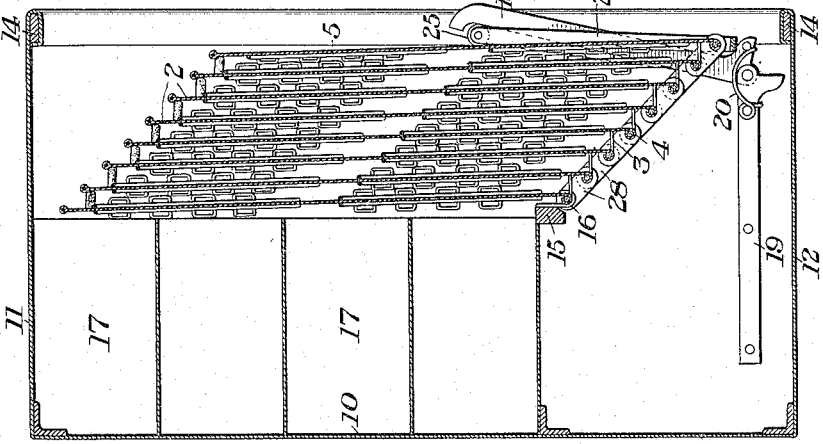

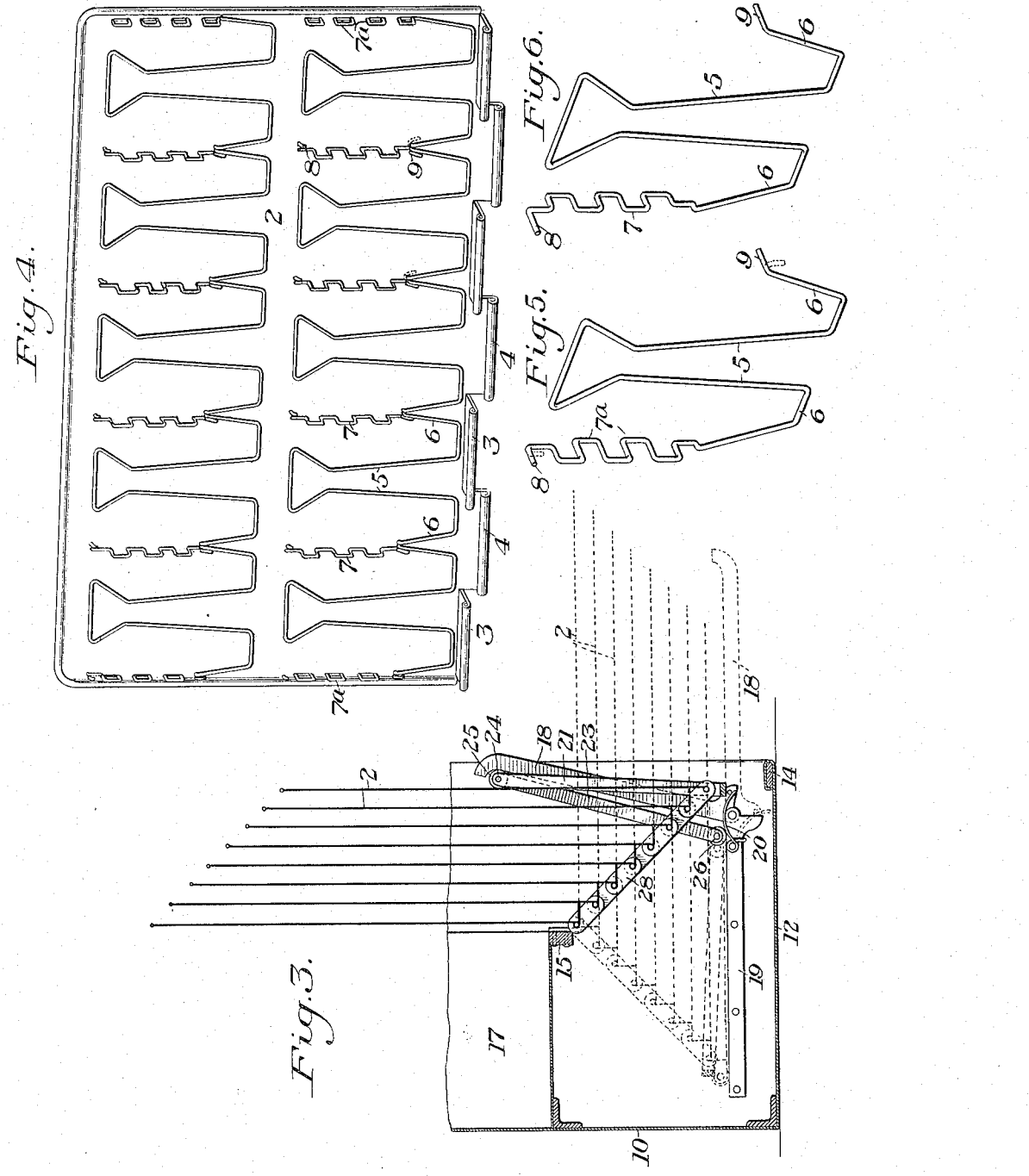

C. P. BYRNES & J. B. HELLER.
CREDIT REGISTER.
APPLICATION FILED MAY 18, 1912.
1,145,552.
Patented July 6, 1915.
4 SHEETS—SHEET 4.
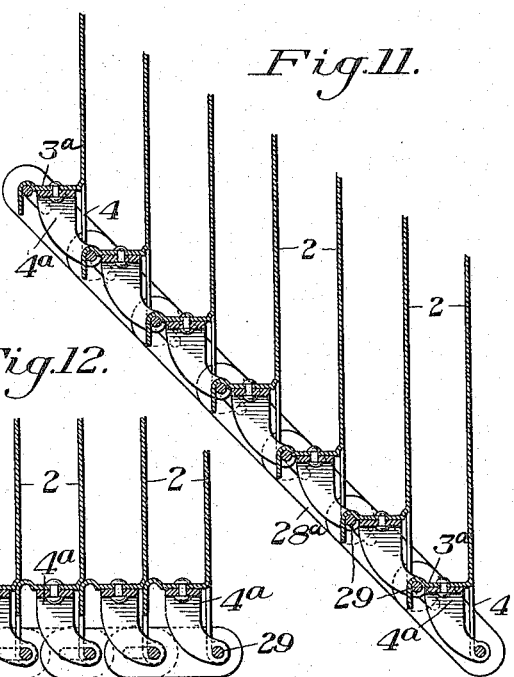
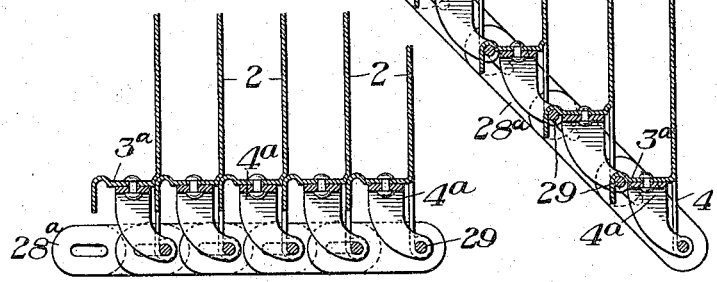
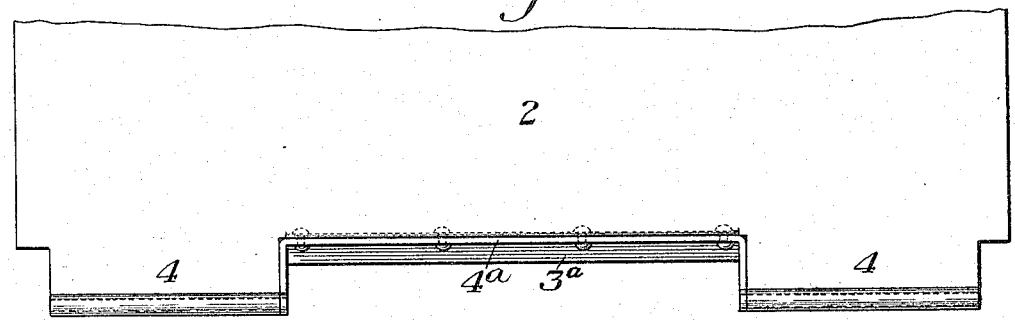
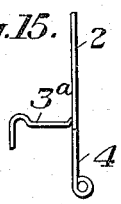
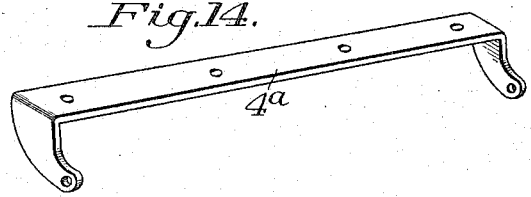
WITNESSES
INVENTORS

UNITED STATES PATENT OFFICE.

CLARENCE P. BYRNES, OF SEWICKLEY, AND JESSE B. HELLER, OF PITTSBURGH, PENNSYLVANIA.

CREDIT-REGISTER.

1,145,552.     Specification of Letters Patent.     Patented July 6, 1915.

Application filed May 18, 1912. Serial No. 698,249.

*To all whom it may concern:*

Be it known that we, CLARENCE P. BYRNES, a resident of Sewickley, Allegheny county, Pennsylvania, and JESSE B. HELLER, a resident of Pittsburgh, Allegheny county, Pennsylvania, have invented a new and useful Credit-Register, of which the following is a full, clear, and exact description, reference being had to the accompanying drawings, forming part of this specification, in which—

Figure 1 is a front elevation showing one form of our improved register; Fig. 2 is a vertical cross-sectional view; Fig. 3 is a diagrammatic view showing the position of the leaves when swung down; Fig. 4 is a perspective view showing one of the leaves and attachments; Figs. 5 and 6 are perspective views showing clips; Figs. 7 and 8 are detail views of the leaf-supporting device; Figs. 9 and 10 are detail views showing a modification; Fig. 11 is a view similar to Fig. 9 showing another modified form of leaf and connections; Fig. 12 is also a sectional view of the type of leaf shown in Fig. 11 with the leaves bunched; Fig. 13 is a detail front view of a portion of one of the leaves shown in Figs. 11 and 12; Fig. 14 is a perspective view of the leaf reinforce used in connection with the leaves shown in Fig. 11; and Fig. 15 is an end view of a portion of one of these leaves.

Our invention relates to the leaf type of credit registers, particularly the type wherein a series of leaves is normally held in vertical position and is thrown down to horizontal position when desired.

The invention is primarily designed to overcome certain difficulties in the type of register wherein the leaves are hinged to each other. Heretofore in such type of registers when part of the leaves were swung down they caused a movement of the vertical leaves. For this reason, it has been necessary to provide guides for the rearmost leaf, which allowed vertical and back and forth movements thereof while holding it against swinging down. Our invention is designed to overcome this difficulty and provide a set of leaves in which the rearmost leaf is pivoted to stationary bearings on the case, the remaining leaves being successively hinged to each other so that when a leaf is thrown down it in no wise moves the remaining vertical leaves. The invention also relates to means for giving a banked or stepped arrangement to such a set of leaves when desired, and also to provide an improved type of leaf, clips, &c.

In the drawings, 2 represents the leaf, which is preferably of sheet metal, and has hinged members 3 and 4 formed by cutting and bending the lower edge portion of the leaf. These hinged members are curled at the edge for receiving the hinge rods, and in the form shown the hinge members 3 extend at right angles to the hinge members 4. We thus form the hinge members from the leaf itself, giving a simple and cheap construction. The hinge members may, however, be varied, and may be arranged to give the leaves a stacked position instead of a banked or staggered position. The other edges of the leaf are curled or bent around a U-shaped reinforcing wire, thus giving a strong wired edge construction.

In order to form cheap and simple divisions or partitions between the spaces for the various slips, we preferably combine these partitions with the clips both being formed of wire. In Fig. 6 we show such a structure, the wire clip being engaged at 5 and having reversely bent legs 6, 6, forming the spring members of the clip. One of these legs is extended in zig-zag form, as shown at 7, and the part 7 as well as the opposite leg 6 terminates in holding extensions 8 and 9, which are clenched through holes in the leaf. In this form of clip, the zig-zag portion 7 projects from one side of the leaf at right angles to the plane of the clip, as shown on the body or center of the leaf in Fig. 4. This is true of all of the clips, except of the clips on each end of the leaf, these being the ones at the left-hand, facing the leaf. These clips are formed as shown in Fig. 5, being similar to those of Fig. 6, except that some of the zig-zags 7ᵃ are deeper so as to project through slots in the leaf to both sides thereof. These special clips, therefore, provide the end edge holders, while all other clips form the partitions on their own side of the leaf. When a series of these leaves is hinged together by ordinary hinge rods extended through the hinge members, the upper edges of the leaves will take a stepped position, thus providing for indexing along their upper edges. The leaves may, however, be arranged in book or stack form by shaping the hinges differently, and we do not wish to limit ourselves to the stepped form shown, in the broader claims. The degree of stepping may also be varied by changing the angle of the hinge members 3 and 4, or by shortening the hinge members, or both.

The case in which the set of leaves is mounted may be of any desirable shape, and is preferably formed of sheet metal. In the form shown, it is provided with a back 10, top 11, bottom 12 and sides 13. The back and the sides, and the back and the top and bottom may be formed in one piece, and I have shown the edge of the open front strengthened by flanging around a strengthening bar 14. In the lower part of this case, and intermediate of its width, is placed a supporting cross-bar 15 provided with separated hook members 16 depending therefrom and arranged to engage the hinge lugs of the rearmost leaf, thus supporting the stack of leaves in the case. Owing to the supporting of the rearmost leaf of the set, when a leaf or leaves is thrown down there will be no movement of the leaves left standing. There is, therefore, no need of guides or other attachments for holding the rear leaf while allowing movements thereof.

When the leaves are swung down into a horizontal position, their hinges move downwardly and backwardly, and when all the leaves are thrown down, the set of hinge members will take the downwardly and backwardly inclined position shown in dotted lines in Fig. 3. This is the reason for supporting the set of leaves at an intermediate point in the depth of the case. As this provides a space back of the leaves, provided the back of the case is flat, the space thus left may be employed for storing the blanks, &c., used in the system. For this purpose, I have shown this space as divided up into a series of pigeon holes or receptacles 17, which are accessible by throwing down the set of leaves.

In order to support the forward portions of the leaves when swung down, I preferably employ a pair of swinging supports 18, which are hinged to the front ends of stationary track bars 19 secured to the sides of the case. The hinges between these members are so shaped as to maintain the swinging members 18 in the horizontal position as extensions of the bars 19, when any of the leaves are thrown down. To normally hold the arms 18 in the vertical position when all the leaves are in normal vertical position, we may provide springs 20 engaging suitable projections on the hinge members, as shown in Figs. 2 and 7.

In order to hold the leaves in vertical position, we preferably provide spring mechanism, which may be arranged as one spring mechanism to act upon the leaves through their hinges, or may be in the form of individual spring-actuated hinges for each leaf.

In Figs. 1 to 8, we show a single spring mechanism, which comprises a U-shaped yoke having side arms 21 with recesses 21ª near their rear ends to receive the projecting ends of the front hinge rod of the forward leaf. The upper ends of the arms have inwardly bent projections 22, engaging the forward leaf, and these upper ends are pivotally connected to links 23 by means of pivot pins 24 having rollers 25 which rest and move along the track extensions 18. The other ends of these links are also provided with similar rollers 26 moving on the tracks 19. Surrounding the pivot pin 24 is a coil spring 27 having arms suitably engaged with the arms 21 and the links 23 so as to give turning movement to the arms 21. This turning movement will tend to keep the leaves in an upright position when the leaves are in their raised position and retain them in their downward position when they are swung down. These springs, therefore, will hold down such leaves as are swung down and at the same time hold up those that are not swung down. The leaves which are swung down pass a center or point beyond which the spring tends to hold them down while at the same time the forward leaves, acting through their hinge members will react on the rear leaves to hold up those that are not thrown down. As the successive leaves are thrown down, the rollers 25 and 26 will travel along the tracks and the hinge members of the leaves will move backwardly to successively different positions within the case. In order to strengthen the structure, and remove the strains from the hinge lugs, we preferably connect the projecting ends of the successive hinge pins by chain links 28, as best shown in Fig. 7. These links will receive and convey the strains from leaf to leaf and take such strains off the hinge lugs.

Instead of using the spring mechanism just described, we may provide the successive hinges with springs coacting with cam faces in such a way as to hold the leaves both in upright and in horizontal position, or at least in vertical position. Thus, in Figs. 9 and 10 we show the wire hinge rods 29 as extending through the forked ends of one hinge lug and the interfitting tongue end of the next adjacent hinge lug. Each such hinge member has a tongue end and a forked end. Secured to the forked end of each hinge lug is the forked position 30 of a leaf spring, the arm 31 of this spring normally resting on the flat face 32 of the tongue end of the next hinge member. These tongue ends have two flat faces 32 and 33, so that the springs acting on the flat faces will hold the leaves in the two different positions.

In Figs. 11 to 15 we have shown another modified form of leaf, which can readily be stacked to file the same away in a safe. In this construction, the leaf is also provided with members 3ª and 4, and which are reinforced by means of a bracket 4ª attached to the member 3ª. The member 3ª is formed with an open loop which engages the hinge rod of an adjacent leaf when the leaves are in use, as shown in Fig. 11, and the links 28ª are slotted in order to permit the links to close up when the leaves are filed away in the manner shown in Fig. 12. These leaves may be held in their proper position when in use, by spring mechanism of any desired character.

The advantages of our invention result from the cheapness, simplicity and compactness of the device, also from the supporting of the vertical stack of leaves by the rearmost leaf, which avoids movement of the vertical leaves when one or more of the front leaves is swung down. The leaf construction is simple and cheap, the parts may be made by automatic machinery and merely assembled by hand, and a strong and attractive construction is afforded. The riveting, or otherwise securing of division strips to the leaves is avoided, and the combined clip and division strip may be easily and quickly applied and secured.

Many changes may be made in the form of the case, leaves, hinges &c., without departing from our invention. The leaf and its structure may also be used without hinging the leaves to each other or supporting from the back leaf. In other words, some of the features of leaf construction are independent of the particular kind of hinging and supporting.

We claim:—

1. A credit register having a set of leaves in stepped relation and hinged to each other, and means for supporting a rear leaf, and thereby the entire set, substantially as described.

2. In a credit register, a set of leaves in stepped relation and hinged to each other, means for supporting the rearmost leaf on a stationary pivot, the hinged connections constituting the sole hinged support for the other leaves, substantially as described.

3. In a credit register, a series of leaves in stepped relation hinged to each other normally in vertical position, and a fixed support for the rearmost leaf, the other leaves being supported through their hinge connections to each other and the rear leaf; substantially as described.

4. In a credit register, a case having a fixed support, and a set of leaves in stepped relation hinged to each other, the rearmost leaf being adapted to removably engage the fixed support and support the other leaves through the hinge connections; substantially as described.

5. A credit register having a set of leaves in stepped relation and hinged to each other, and means for supporting a rear leaf and thereby the entire set, said hinges being arranged for permitting said leaves to be bunched to place the tops of all of said leaves in a common plane, approximately at right angles to the planes of the leaves, substantially as described.

In testimony whereof, we have hereunto set our hands.

C. P. BYRNES.
JESSE B. HELLER.

Witnesses:
GEO. B. BLEMING,
GEO. H. PARMELEE.

Copies of this patent may be obtained for five cents each, by addressing the "Commissioner of Patents, Washington, D. C."